(12) United States Patent
Kim et al.

(10) Patent No.: US 9,153,967 B2
(45) Date of Patent: Oct. 6, 2015

(54) BATTERY SYSTEM AND ENERGY STORAGE SYSTEM INCLUDING THE SAME

(75) Inventors: Jae-Soon Kim, Yongin-si (KR); Jin-Hong An, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 886 days.

(21) Appl. No.: 13/369,909

(22) Filed: Feb. 9, 2012

(65) Prior Publication Data

US 2012/0249078 A1 Oct. 4, 2012

(30) Foreign Application Priority Data

Mar. 31, 2011 (KR) ........................ 10-2011-0029856

(51) Int. Cl.
*H02J 7/00* (2006.01)
*H02J 7/14* (2006.01)
*H02J 3/38* (2006.01)
*H02J 3/32* (2006.01)

(52) U.S. Cl.
CPC . *H02J 3/385* (2013.01); *H02J 3/32* (2013.01); *H02J 3/382* (2013.01); *H02J 3/386* (2013.01); *H02J 3/383* (2013.01); *H02J 7/0031* (2013.01); *H02J 7/0073* (2013.01); *Y02E 10/563* (2013.01); *Y02E 10/566* (2013.01); *Y02E 10/58* (2013.01); *Y02E 10/763* (2013.01); *Y02E 70/30* (2013.01)

(58) Field of Classification Search
USPC ......... 320/134, 128, 135, 136, 124, 125, 132, 320/127
See application file for complete search history.

(56) References Cited

U.S. PATENT DOCUMENTS

| 6,104,165 A * | 8/2000 | Miyamoto et al. ............ 320/125 |
| 6,522,102 B1 * | 2/2003 | Cheiky et al. ................. 320/125 |
| 6,946,818 B2 | 9/2005 | Cawthorne et al. |
| 7,498,769 B1 * | 3/2009 | Potanin et al. ................ 320/125 |
| 8,694,803 B1 * | 4/2014 | Rafiee .......................... 713/300 |
| 2006/0087291 A1 | 4/2006 | Yamauchi |
| 2007/0257642 A1 * | 11/2007 | Xiao et al. ..................... 320/134 |
| 2008/0224667 A1 | 9/2008 | Tanaka et al. |
| 2009/0085527 A1 * | 4/2009 | Odaohhara .................... 320/150 |
| 2009/0243550 A1 * | 10/2009 | Arai et al. ..................... 320/157 |
| 2009/0295332 A1 | 12/2009 | Yang et al. |
| 2010/0201323 A1 * | 8/2010 | Okamura ...................... 320/134 |
| 2011/0050239 A1 | 3/2011 | Hoshino |
| 2011/0199055 A1 * | 8/2011 | Burchardt et al. ............ 320/148 |

FOREIGN PATENT DOCUMENTS

JP 2001-157369 A 6/2001

OTHER PUBLICATIONS

Korean Office Action dated Feb. 27, 2013 in connection with Korean Patent Application No. 10-2011-0029856 and Request for Entry of the Accompanying Office Action attached herewith.

\* cited by examiner

*Primary Examiner* — Edward Tso
*Assistant Examiner* — Alexis Boateng
(74) *Attorney, Agent, or Firm* — Robert E. Bushnell, Esq.

(57) ABSTRACT

A battery system and an energy storage system including a battery module. The battery system includes at least one battery module that may perform charging and discharging, and a battery management unit that controls the charging and the discharging of the battery module. The battery management unit varies a charge limit value for stopping the charging of the battery module and a discharge limit value for stopping the discharging of the battery module. Accordingly, a lifetime of the battery module is extended.

14 Claims, 6 Drawing Sheets

BATTERY SYSTEM AND ENERGY STORAGE SYSTEM INCLUDING THE SAME

CLAIM OF PRIORITY

This application makes reference to, incorporates the same herein, and claims all benefits accruing under 35 U.S.C. §119 from an application earlier filed in the Korean Intellectual Property Office on Mar. 31, 2011 and there duly assigned Serial No. 10-2011-0029856.

BACKGROUND OF THE INVENTION

1. Field of the Invention

The present invention generally relates to a battery system and an energy storage system.

2. Description of the Related Art

As problems, such as environmental contamination and resource exhaustion, increase, interest in systems for storing energy and efficiently using the stored energy also increase. There is also increased interest in renewable energy that does not cause pollution during power generation. Thus, research into energy storage systems, which may be used with renewable energy, a power storage battery system, and existing grid power, has been actively conducted as changes occur in domestic and overseas environments.

Battery systems may be supplied with external power, store the supplied power, and externally supply the stored power. That is, battery systems may perform charging and discharging operations. Many attempts have been made to stably perform charging and discharging operations by efficiently controlling battery systems.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a battery system that may extend a lifetime of a battery module and an energy storage system including the battery system.

Additional aspects will be set forth in part in the description which follows and, in part, will be apparent from the description, or may be learned by practice of the presented embodiments.

According to one or more embodiments of the present invention, a battery system may include: at least one battery module that may perform charging and discharging; and a battery management unit that controls the charging and the discharging of the battery module, wherein the battery management unit varies a charge limit value for stopping the charging of the battery module and a discharge limit value for stopping the discharging of the battery module as a time elapses.

The battery management unit may increase a width between the charge limit value and the discharge limit value as the time elapses.

The battery management unit may adjust the charge limit value and the discharge limit value such that an amount of power that the battery module may provide is constant before and after the width is changed.

The time elapses may refer to a number of times the charging and the discharging of the battery module are repeatedly performed increases.

An amount of power that may be provided at an early stage of use of the battery module may be set to be greater than an amount of power required by the external power source/load.

The charge limit value and the discharge limit value may be voltage values.

The battery management system may include a voltage measurement unit that measures a voltage of the battery module, wherein it is determined whether the battery module reaches the charge limit value or the discharge limit value according to the voltage measured by the voltage measurement unit.

According to one or more exemplary embodiments of the present invention, an energy storage system may include: a battery system that supplies power to the external power source/load and stores power supplied from the external power source/load; and a power conversion system that converts first power stored in the battery system into second power required by the external power source/load and converts the second power supplied from the external power source/load into the first power required by the battery system, wherein the battery system includes: at least one battery module that may perform charging and discharging; and a battery management unit that controls the charging and the discharging of the battery module, and varies a charge limit value for stopping the charging of the battery module and a discharge limit value for stopping the discharging of the battery module according to an elapse of a time.

The battery management unit may increase a width between the charge limit value and the discharge limit value according to the elapse of the time.

The battery management unit may adjust the charge limit value and the discharge limit value such that an amount of power that the battery module may provide is constant before and after the width is changed.

The time elapses may refer to the number of times the charging and the discharging of the battery modules are repeatedly performed increases.

An amount of power that may be provided at an early stage of use of the battery module may be set to be higher than an amount of power required by the external power source/load.

The charge limit value and the discharge limit value may be voltage values.

The battery management unit may include a voltage measurement unit that measures a voltage of the battery module and determine whether the battery module reaches the charge limit value or the discharge limit value according to the voltage measured by the voltage measurement unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
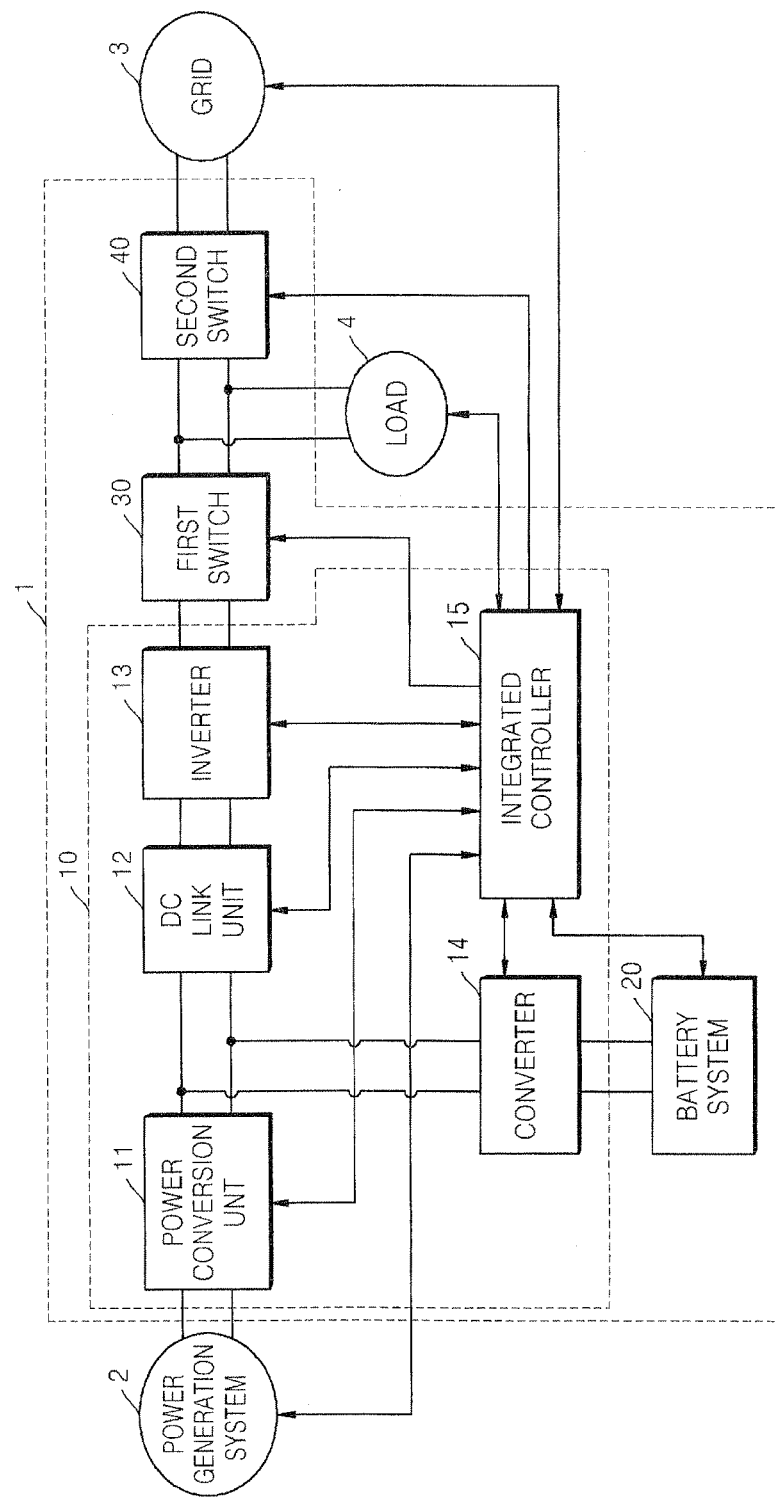
FIG. 1 is a block diagram of an energy storage system according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Reference will now be made in detail to embodiments, examples of which are illustrated in the accompanying drawings. In the drawings, the same elements are denoted by the same reference numerals, and a repeated explanation thereof will not be given.

FIG. 1 is a block diagram of an energy storage system 1 according to an embodiment of the present invention.

Referring to FIG. 1, the energy storage system 1 is used with a power generation system 2 and a grid 3 to supply power to a load 4.

The power generation system 2 is a system that generates power by using an energy source. The power generation system 2 generates power and supplies the power to the energy storage system 1. The power generation system 2 may be a solar power generation system, a wind power generation system, or a tidal power generation system. However, the solar power generation system, the wind power generation system, and the tidal power generation system are merely examples power generation sources and the present embodiment is not limited thereto. The power generation system 2 may be any power generation system that may generate power by using renewable energy such as solar heat or geothermal heat. In particular, a solar cell for generating electrical energy by using sunlight may be applied to the energy storage system 1, which may be distributed in houses and factories, because it is easy to install the solar cell therein. The power generation system 2 may act as a high-capacity energy system by generating power by using a plurality of power generation modules that are arranged in parallel.

The grid 3 includes a power plant, a substation, power lines, and the like. If the grid 3 is in a normal state, the grid 3 supplies power to the energy storage system 1 to supply the power to the load 4 and/or a battery system 20, and receives power supplied from the energy storage system 1. If the grid 3 is in an abnormal state, the grid 3 does not supply power to the energy storage system 1, and the energy storage system 1 stops supplying power to the grid 3.

The load 4 consumes power generated by the power generation system 2, power stored in the battery system 20, or power supplied from the grid 3. A house or a factory may be an example of the load 4.

The energy storage system 1 may store power generated by the power generation system 2 in the battery system 20, and supply the generated power to the grid 3. The energy storage system 1 may supply power stored in the battery system 20 to the grid 3, or store power supplied from the grid 3 in the battery system 20. In an abnormal situation, for example, if there is a power failure in the grid 3, the energy storage system 1 may supply power to the load 4 by performing an uninterruptible power supply (UPS) operation. Even if the grid 3 is in a normal state, the energy storage system 1 may supply power generated by the power generation system 2 or power stored in the battery system 20 to the load 4.

The energy storage system 1 includes a power conversion system (PCS) 10 that controls power conversion, the battery system 20, a first switch 30, a second switch 40, etc.

The PCS 10 converts power of the power generation system 2, the grid 3, and the battery system 20 into suitable power and supplies the converted power to where needed. The PCS 10 includes a power converting unit 11, a direct current (DC) link unit 12, an inverter 13, a converter 14, and an integrated controller 15.

The power converting unit 11 may be connected between the power generation system 2 and the DC link unit 12. The power converting unit 11 delivers power generated by the power generation system 2 to the DC link unit 12. At this time, an output voltage of power output from the power converting unit 11 is converted into a DC link voltage.

The power converting unit 11 may include a power conversion circuit, such as a converter or a rectifier circuit, according to the type of the power generation system 2. If the power generation system 2 generates DC power, the power converting unit 11 may include a converter for converting the DC power to DC power. On the contrary, if the power generation system 2 generates alternating current (AC) power, the power converting unit 11 may include a rectifier circuit for converting the AC power to DC power. In particular, if the power generation system 2 is a solar power generation system, the power converting unit 11 may include a maximum power point tracking (MPPT) converter so as to obtain maximum power output from the power generation system 2 according to a change in solar radiation, temperature, or the like. When the power generation system 2 generates no power, the power converting unit 11 may stop operating and minimize power consumption of a converter included in the power converting unit 11 or the like.

A level of the DC link voltage may become unstable due to an instantaneous voltage drop in the power generation system 2 or the grid 3 or a peak load in the load 4. However, the DC link voltage needs to be stabilized to normally operate the inverter 13 and the converter 14. The DC link unit 20 may be connected between the power converting unit 11 and the inverter 13 and maintains the DC link voltage. The DC link unit 12 may be, for example, a mass storage capacitor.

The inverter 13 may be a power converter connected between the DC link unit 12 and the first switch 30. The inverter 13 may include an inverter that converts the DC link voltage output from the power generation system 2 and/or the battery system 20 into an AC voltage of the grid 3 and outputs the AC voltage in a discharging mode. The inverter 13 may include a rectifier circuit that rectifies an AC voltage output from the grid 3 into the DC link voltage to be stored in the battery system 20 in a charging mode.

The inverter 13 may be a bidirectional inverter in which directions of input and output are changeable. Alternatively, the inverter 13 may include a plurality of inverters such that directions of input and output are changeable.

The inverter 13 may include a filter for removing harmonics from the AC voltage output to the grid 3, and a phase-locked loop (PLL) circuit for matching a phase of the AC voltage output from the inverter 13 to a phase of the AC voltage of the grid 3 in order to prevent generation of reactive power. Also, the inverter 13 may perform other functions such as restriction of voltage variation range, power factor correction, removal of DC components, and protection of transient phenomenon. When the inverter 30 is not used, the operation of the inverter 13 may be stopped so as to minimize power consumption.

The converter 14 may be a power converter that is connected between the DC link unit 12 and the battery system 20. The converter 14 may include a converter that performs DC-DC conversion by converting a voltage of power output from the battery system 20 into a voltage level, i.e., the DC link voltage that is required by the inverter 13 in a discharging mode. Also, the converter 14 may include a converter that performs DC-DC conversion by converting a voltage of power output from the power converting unit 11 or the inverter 13 into a voltage level, i.e., a charge voltage required by the battery system 20 in a charging mode. When there is no need to charge or discharge the battery system 20, the operation of the converter 14 may be stopped so as to minimize power consumption.

The converter 14 may be a bidirectional converter in which directions of input and output are changeable. Alternatively, the converter 14 may include a plurality of converters such that directions of input and output are changeable.

The integrated controller 15 monitors states of the power generation system 2, the grid 3, the battery system 20, and the load 4, and controls the power converting unit 11, the inverter 13, the converter 14, the battery system 20, the first switch 30, and the second switch 40 according to results of the monitoring. The integrated controller 15 may monitor whether a power failure occurs in the grid 3, whether the power generation system 2 generates power, an amount of power generated by the power generation system 2, a charge state of the battery system 20, an amount of power consumed by the load 4, time, and the like. If power to be supplied to the load 4 is insufficient, such as when a power failure occurs in the grid 3, the integrated controller 15 may control the load 4 to determine priorities for devices which use power included in the load 4 and supply power to the devices which use power having high priorities.

The first switch 30 and the second switch 40 may be connected in series between the inverter 13 and the grid 3, and control the flow of current between the power generation system 2 and the grid 3 by being turned on or off under the control of the integrated controller 15. The first switch 30 and the second switch 40 may be turned on or off according to states of the power generation system 2, the grid 3, and the battery system 20.

More specifically, if power of the power generation system 2 and/or the battery system 20 is supplied to the load 4 or power of the grid 3 is supplied to the battery system 20, the first switch 30 is turned on. If power of the power generation system 2 and/or the battery system 20 is supplied to the grid 3 or power of the grid 3 is supplied to the load 4 and/or the battery system 20, the second switch 40 is turned on.

Meanwhile, if there is a power failure occurs in the grid 3, the second switch 40 is turned off and the first switch 30 is turned on. Accordingly, power from the power generation system 2 and/or the battery system 20 may be supplied to the load 4, but may not flow into the grid 3, which prevents the energy storage system 1 from operating solely, thereby preventing a worker who works at a power distribution line of the grid 3 or the like from getting an electric shock due to the power of the energy storage system 1.

Switching devices like relays capable of enduring a large amount of current may be used as the first switch 30 and the second switch 40.

The battery system 20 receives and stores power generated by the power generation system 2 and/or power output from the grid 3, and supplies power stored to the load 4 or the grid 3. The battery system 20 may include a portion for storing power and a portion for controlling and protecting the portion for storing power. Hereinafter, the battery system 20 will be described in detail with reference to FIG. 2.

Figure 2:
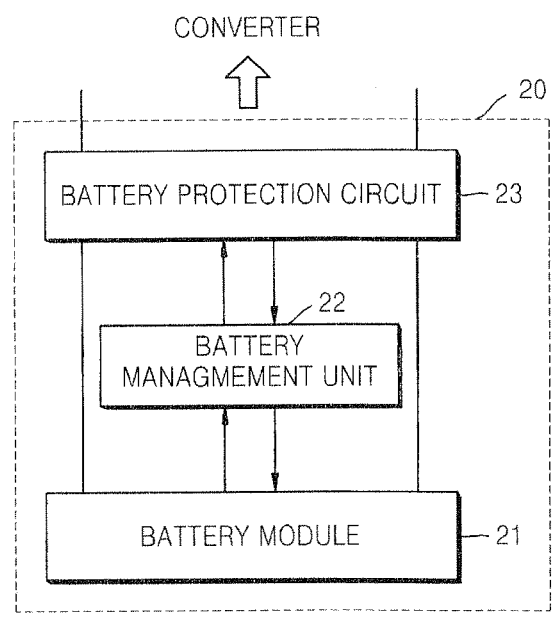
FIG. 2 is a block diagram illustrating a battery system according to an embodiment of the present invention.

FIG. 2 is a block diagram of the battery system 20 according to an embodiment of the present invention. Referring to FIG. 2, the battery system 20 includes a battery module 21, a battery management system (BMS) 22, and a battery protection circuit 23.

The battery module 21 stores power supplied from an external power source/load, that is, the power generation system 2 and/or the grid 3, and supplies the power to the load 4 and/or the grid 3.

The battery module 21 refers to a structure including a plurality of battery sub-units. For example, if the battery system 20 is a battery rack may include a plurality of battery trays, the battery rack may be referred to as the battery module 21. Likewise, if a battery tray includes a plurality of battery cells, the battery tray may be referred to as the battery module 21.

The BMS 22 may be connected to the battery module 21 and controls charging and discharging operations of the battery module 21. Also, the BMS 22 may perform overcharge protection, over-discharge protection, over-current protection, overvoltage protection, overheat protection, cell balancing, etc. To this end, the BMS 22 may include a measurement unit that measures voltage, current, temperature, a remaining amount of power, lifetime, and a state of charge (SOC) from the battery module 21, generates a control signal according to results of the measurement, and controls the battery protection circuit 23. The BMS 22 may apply the results of the measurement to the integrated controller 15, and receive a command relating to a control of the battery module 21 from the integrated controller 15.

Meanwhile, the BMS 22 may determine a power duration of the battery module 21 by setting a charge limit value and a discharge limit value. Here, the charge limit value is a reference value for stopping charging of the battery module 21. For example, when a specific measured value, for example, a voltage value, reaches the charge limit value, charging of the battery module 21 is stopped. Likewise, the discharge limit value is a reference value for stopping discharging of the battery module 21.

The charge limit value and the discharge limit value set by the BMS 22 each may be a SOC or another parameter for determining a SOC. Accordingly, the BMS 22 may determine a SOC by using a voltage measuring method, current integrating method, or current integrating and a Kalman filter method. However, the methods are exemplary and the present embodiment is not limited thereto.

Also, as another parameter for determining a SOC, the charge limit value and the discharge limit value each may be a voltage value. That is, the BMS 22 may measure a voltage of the battery module 21 by using the afore-described measurement unit, and determine whether the battery module 21 reaches the charge limit value or the discharge limit value according to the voltage measured by the measurement unit.

The BMS 22 may correct the charge limit value and the discharge limit value to other values. An operation of setting and correcting the charge limit value and the discharge limit value performed in the BMS 22 will be explained in detail with reference to FIGS. 4 through 8.

The battery protection circuit 23 may be connected between the battery module 21 and the converter 14, and prevents the battery module 21 from being damaged. The battery protection circuit 23 may receive a control signal from the BMS 22 and control a flow of current. The battery protection circuit 23 also may measure an entire output voltage or current of the battery module 21 and transmit results of the measurement to the BMS 22. In this regard, the battery protection circuit 23 may be physically separated from the BMS 22. In other words, the BMS 22 may be separated from the battery protection circuit 23 formed on a high current path and protect the BMS 22 from high current.

Figure 3:
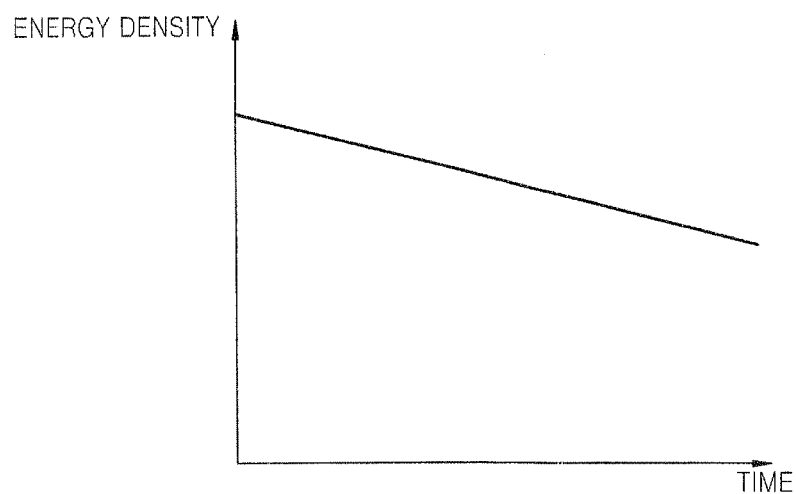
FIG. 3 is a graph illustrating a relationship between time and the performance of a battery module.

FIG. 3 is a graph illustrating a relationship between time and the performance of the battery module 21. A horizontal axis represents time and a vertical axis represents energy density of the battery module 21.

As shown in FIG. 3, in general, as time elapses, that is, as the number of times charging is performed increases, the performance of the battery module 21 may be reduced. This means that when it is assumed that the battery module 21 is fully charged, the amount of power is reduced toward a late stage of use away from an early stage of use. Accordingly, the energy storage system 1 including the battery system 20 does not supply as much power as required during design as time elapses.

Figure 4:
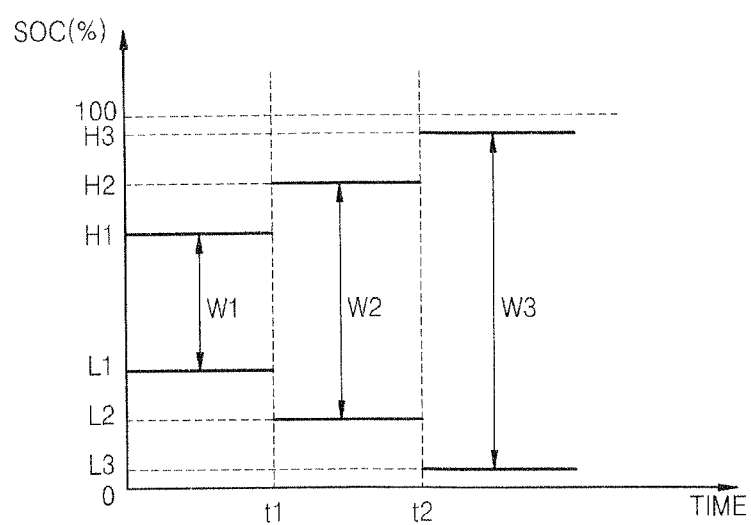
FIG. 4 is a graph for explaining a method of performing charging of a battery module, according to an embodiment of the present invention.

FIG. 4 is a graph for explaining a method of performing charging of the battery module 21, according to an embodiment of the present invention. A horizontal axis represents time and a vertical axis represents an SOC.

Referring to FIG. 4, at an early stage of use of the battery module 21, a charge limit value is set to H1 and a discharge limit value is set to L1. For example, the charge limit value H1 may be 70% and the discharge limit value L1 may be 30%. In this case, a width between the charge limit value H1 and the discharge limit value L1 is W1. The BMS 22 controls charging and discharging of the battery module 21 to be performed between the charge limit value H1 and the set discharge limit value L1 for a predetermined period of time.

Since the performance of the battery module 21 is reduced as time elapses, when charging is performed until the battery module 21 reaches the charge limit value H1 and discharging is performed until the battery module 21 reaches the discharge limit value L1, the amount of power that may be provided is reduced at a time t1 to be less than that at the early stage of use. Accordingly, when it is a preset time, for example, the number of times charging is performed is counted and reaches a preset number of times, the BMS 22 corrects the charge limit value H1 and the discharge limit value L1 to H2 and L2, respectively. For example, the charge limit value H2 may be 80% and the discharge limit value L2 may be 20%.

A width W2 between the charge limit value H2 and the discharge limit value L2 are corrected such that a width W2 between the charge limit value H2 and the discharge limit value Le is greater than the width W1. Also, the amount of power that may be provided when charging is performed until the battery module 21 reaches the charge limit value H2 and then discharging is performed until the battery module 21 reaches the discharge limit value L2 is substantially the same as the amount of power that may be provided when charging is performed until the battery module 21 reaches the charge limit value H1 and then discharging is performed until the battery module 21 reaches the discharge limit value L1.

After the charge limit value H1 and the discharge limit value L1 are respectively corrected to the charge limit value H2 and the discharge limit value L2, when a preset time elapses again, the charge limit value H2 and the discharge limit value L2 are corrected to H3 and L3, respectively. For example, the charge limit value H3 may be 90% and the discharge limit value L3 may be 10%.

The charge limit values H1 through H3 and the discharge limit values L1 through L3 are mere examples and the present embodiment is not limited thereto. The charge limit values H1 through H3 and the discharge limit values L1 through L3 may be determined according to the performance of the battery module 21.

Although the charge limit value and the discharge limit value are corrected two times in FIG. 4, the present embodiment is not limited thereto. That is, the BMS 22 may correct the charge limit value and the discharge limit value one time, or three or more times.

Also, in order to set the charge limit value and the discharge limit value of the battery module 21, the battery module 21 should have a capacity that is greater than the amount of power required during design in the beginning.

Figure 5:
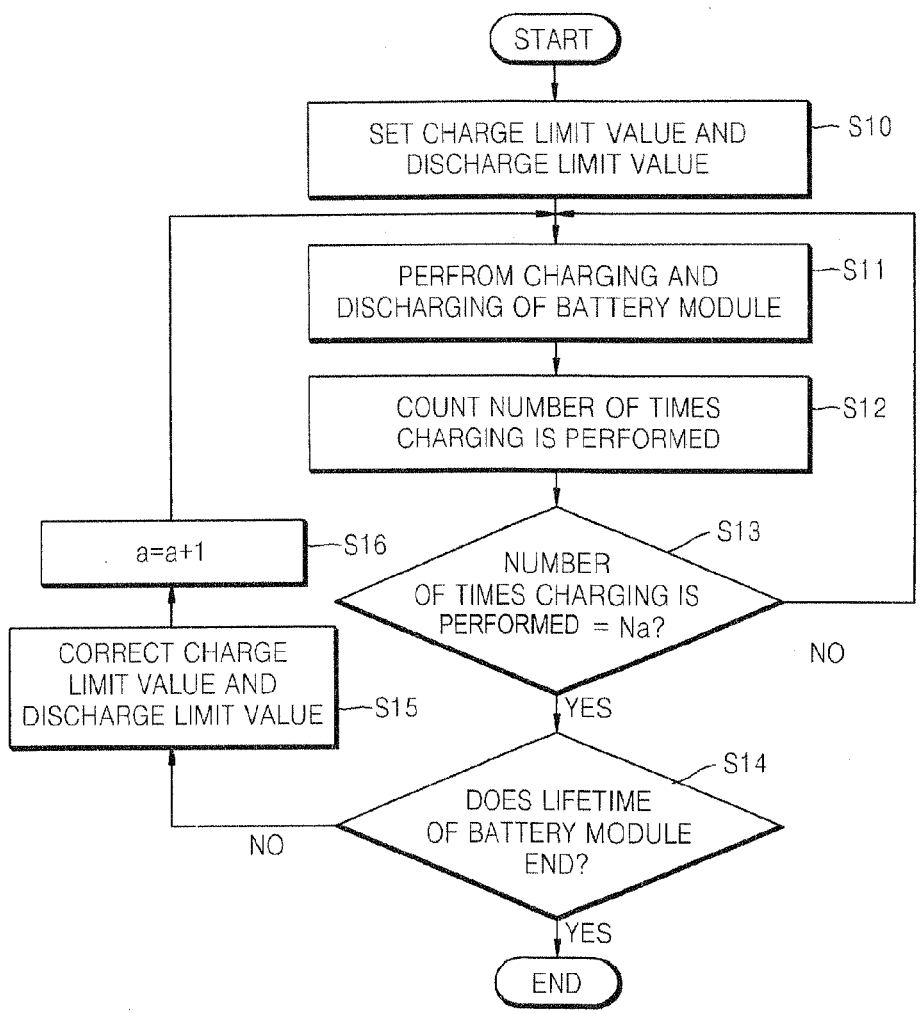
FIG. 5 is a flowchart illustrating a method of controlling the battery system, according to an embodiment of the present invention.

FIG. 5 is a flowchart illustrating a method of controlling the battery system 20, according to an embodiment of the present invention.

Referring to FIG. 5, in operation S10, a charge limit value and a discharge limit value are set in the BMS 22 by a user or during manufacture. In this case, 'a' is set to 0.

In operation S11, the battery module 21 may perform discharging in order to supply power to the external power source/load, and may perform charging by receiving power from the external power source/load. In operation S12, the BMS 22 counts the number of times charging is performed by monitoring charging and discharging operations of the battery module 21.

In operation S13, it is determined whether the number of times charging is performed is a preset number of times Na. If it is determined in operation S13 that the number of times charging is performed is less than the present number of times Na, operations S11 through S13 are repeatedly performed.

If it is determined in operation S13 that the number of times charging is performed is equal to the preset number of times Na, the method proceeds to operation S14. In operation S14, it is determined whether a lifetime of the battery module 21 ends. If it is determined in operation S14 that the lifetime of the battery module 21 does not end, the method proceeds to operation S15. In operation S15, the charge limit value and the discharge limit value are corrected. In operation S16, 1 is added to 'a'. The method returns to operation S11.

Of course, when the lifetime of the battery module 21 ends, since the battery module 21 may not be used any longer, additional steps are taken, for example, the charging and discharging operations may be stopped and the battery module 21 may be exchanged.

Figure 6:
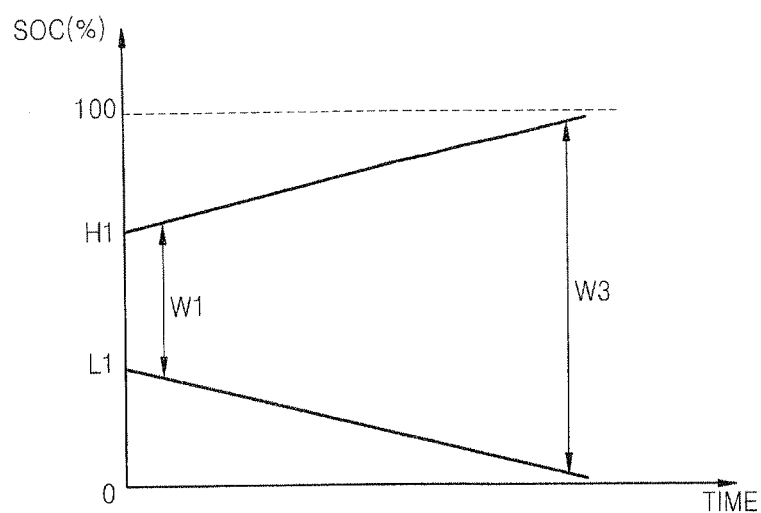
FIG. 6 is a graph for explaining a method of performing charging of the battery module, according to another embodiment of the present invention.

FIG. 6 is a graph for explaining a method of performing charging of the battery module 21, according to another embodiment of the present invention.

Referring to FIG. 6, as time elapses, a charge limit value and a discharge limit value are corrected substantially continuously and linearly.

Figure 7:
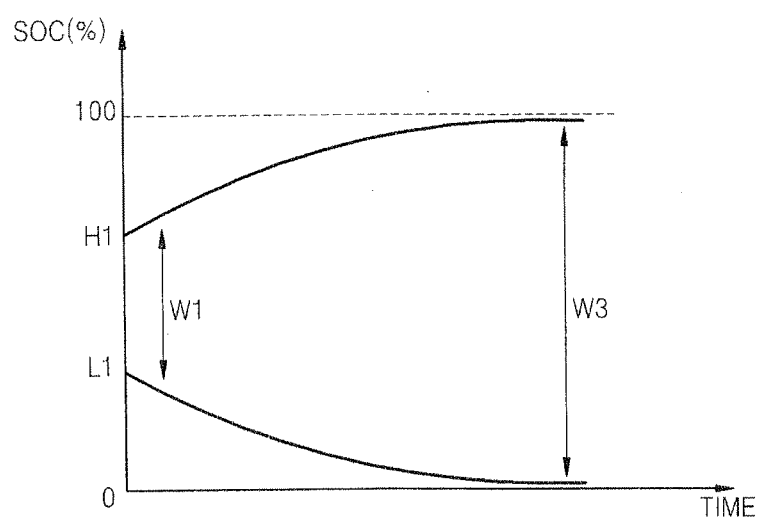
FIG. 7 is a graph for explaining a method of performing charging of the battery module, according to another embodiment of the present invention.

FIG. 7 is a graph for explaining a method of performing charging of the battery module 21, according to another embodiment of the present invention.

Referring to FIG. 7, as time elapses, a charge limit value and a discharge limit value are corrected substantially continuously.

Although methods of correcting a charge limit value and a discharge limit value are illustrated in FIGS. 6 and 7, the methods are exemplary and the embodiments are not limited thereto. That is, shapes of the graphs of FIGS. 6 and 7 may be changed in various ways according to characteristics of the battery module 21. For example, although a speed at which the performance of the battery module 21 is reduced is reduced as time elapses in FIG. 7, a speed at which the battery module 21 is reduced may be increased as time elapses.

Figure 8:
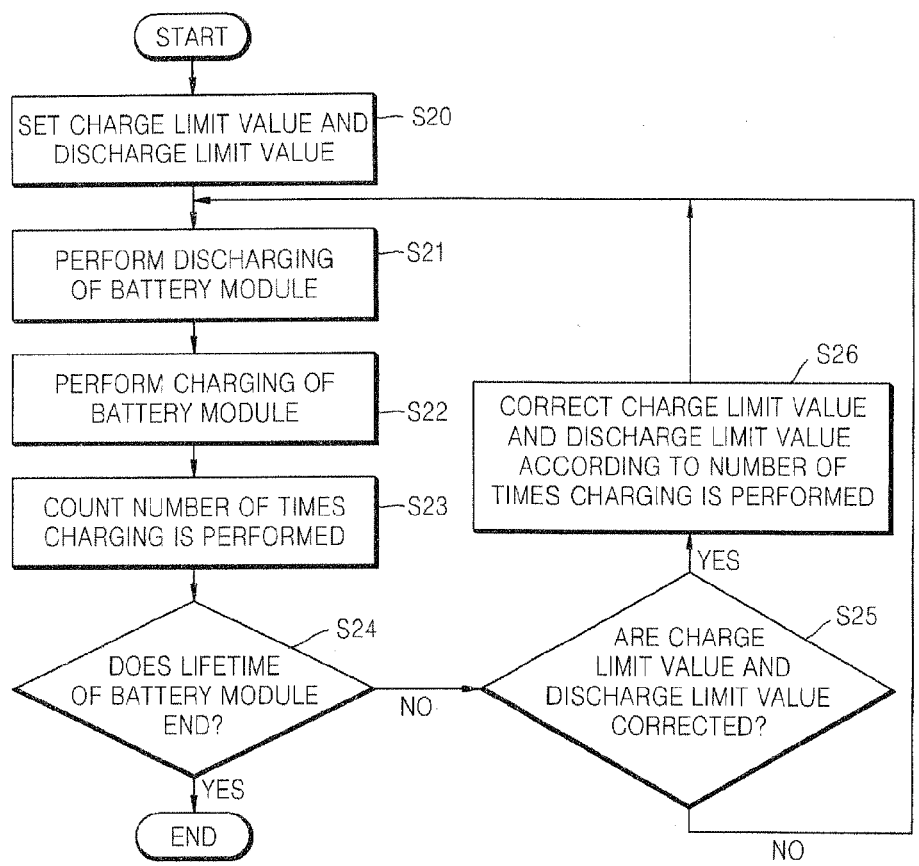
FIG. 8 is a flowchart illustrating a method of controlling the battery system, according to another embodiment of the present invention.

FIG. 8 is a flowchart illustrating a method of controlling the battery system 20, according to another embodiment of the present invention.

Referring to FIG. 8, in operation S20, a charge limit value and a discharge limit value are set in the BMS 22 by a user or during manufacture.

In operation S21, the battery module 21 may perform discharging in order to supply power to the external power source/load. Also, in operation S22, the battery module 21 may perform charging by receiving power from the external power source/load. In operation S23, the BMS 22 counts the number of times charging is performed by monitoring charging and discharging operations of the battery module 21.

In operation S24, it is determined whether a lifetime of the battery module 21 ends. If the lifetime of the battery module 21 ends, since the battery module 21 may not be used any longer, additional steps may be taken, for example, the charging and discharging operations may be stopped and the battery module 21 may be exchanged.

By contrast, if it is determined in operation S24 that the lifetime of the battery module 21 does not end, the method proceeds to operation S25. In operation S25, it is determined whether the charge limit value and the discharge limit value are corrected.

If it is determined in operation S25 that the charge limit value and the discharge limit value are corrected, the method proceeds to operation S26. In operation S26, the charge limit value and the discharge limit value are corrected according to the number of times charging is performed. The method returns to operation S21. If it is determined in operation S25 that the charge limit value and the discharge limit value are not corrected, the method returns to operation S21 without correcting the charge limit value and the discharge limit value.

In general, when the battery module 21 is fully charged or fully discharged, a lifetime of the battery module 21 is reduced. However, as described above, a lifetime of the battery module 21 may be extended by changing a range of use of the battery module 21 as time elapses. Also, the amount of power that may be supplied to the external power source/load may remain constant before and after the range of use is changed by changing the range of use of the battery module 21.

According to the embodiments, a battery system that may extend a lifetime and an energy storage system including the battery system may be provided.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery system, comprising:
at least one battery module that has the capacity of being charged and discharged; and
a battery management unit that controls charging and discharging of the at least one battery module,
wherein the battery management unit determines a count value and varies a charge limit value for stopping the charging of the at least one battery module and a discharge limit value for stopping the discharging of the at least one battery module based on the count value, said count value is a number of times the at least one battery module has been charged and discharged since manufacture of the at least one battery module and increases by one count for each charge and discharge cycle, and
wherein the battery management unit determines a speed of decrease of performance of the at least one battery module in accordance with the count value and determine an increment of a width between the charge limit value and the discharge limit value in accordance with the speed of decrease of performance of the at least one battery module.

2. The battery system of claim 1, wherein the battery management unit reduces the increment of the width when the speed of decrease of performance is decreased in accordance with the count value, and increases the increment of the width when the speed of decrease of performance is increased in accordance with the count value.

3. The battery system of claim 2, wherein the battery management unit adjusts the charge limit value and the discharge limit value such that an amount of power that the battery module provides is constant before and after the width is increased.

4. The battery system of claim 1, wherein an amount of power that may be provided at an early stage of use of the at least one battery module is set to be greater than an amount of power required by an external power source/load.

5. The battery system of claim 1, wherein the charge limit value and the discharge limit value are voltage values.

6. The battery system of claim 5, wherein the battery management system comprises a voltage measurement unit that measures a voltage of the battery module,
wherein it is determined whether the at least one battery module reaches the charge limit value or the discharge limit value according to the voltage measured by the voltage measurement unit.

7. An energy storage system, comprising:
a battery system that supplies power to the external power source/load and stores power supplied from an external power source/load; and
a power conversion system that converts first power stored in the battery system into second power required by the external power source/load and converts the second power supplied from the external power source/load into the first power required by the battery system,
wherein the battery system comprises:
    at least one battery module that is capable of being charged and discharged; and
    a battery management unit determines a count value and controls charging and discharging of the at least one battery module, and varies a charge limit value for stopping the charging of the at least one battery module and a discharge limit value for stopping the discharging of the battery module based on the count value equaling or exceeding a predetermined value, said count value is a number of times the at least one battery module has been charged and discharged since manufacture of the at least one battery module and increases by one count for each charge/discharge cycle, and
wherein the battery management unit determines a speed of decrease of performance of the at least one battery module in accordance with the count value and determine an increment of a width between the charge limit value and the discharge limit value in accordance with the speed of decrease of performance of the at least one battery module.

8. The energy storage system of claim 7, wherein the battery management unit reduces the increment of the width when the speed of decrease of performance is decreased in accordance with the count value, and increases the increment of the width when the speed of decrease of performance is increased in accordance with the count value.

9. The energy storage system of claim 8, wherein the battery management unit adjusts the charge limit value and the discharge limit value such that an amount of power that the at least one battery module provides is constant before and after the width is increased.

10. The energy storage system of claim 7, wherein an amount of power that may be provided at an early stage of use of the at least one battery module is set to be greater than an amount of power required by the external power source/load.

11. The energy storage system of claim 7, wherein the charge limit value and the discharge limit value are voltage values.

12. The energy storage system of claim 11, wherein the battery management unit comprises a voltage measurement unit that measures a voltage of the at least one battery module,
    wherein it is determined whether the at least one battery module reaches the charge limit value or the discharge limit value according to the voltage measured by the voltage measurement unit.

13. The energy storage system of claim 8, wherein the predetermined value is a plurality of predetermined values in which the charge limit value is increased and the discharge limit value is decreased each time the count value equals one of the plurality of predetermined values.

14. The energy storage system of claim 13, wherein the charge limit value and the discharge limit value are voltage values.

* * * * *